United States Patent
Ko et al.

(10) Patent No.: US 9,082,108 B2
(45) Date of Patent: Jul. 14, 2015

(54) REAL TIME COLLABORATION FOR DIGITAL SCENE CREATION

(75) Inventors: Maurice C. F. Ko, Vancouver (CA);
Habib Zargarpour, Vancouver (CA);
Ludovic Jean-Baptiste Aimé Chabant, Burnaby (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 299 days.

(21) Appl. No.: 13/298,200

(22) Filed: Nov. 16, 2011

(65) Prior Publication Data
US 2013/0124637 A1    May 16, 2013

(51) Int. Cl.
| | | |
|---|---|---|
| G06F 15/16 | (2006.01) | |
| G06Q 10/10 | (2012.01) | |
| G06F 17/24 | (2006.01) | |
| G06T 19/20 | (2011.01) | |
| H04L 29/08 | (2006.01) | |

(52) U.S. Cl.
CPC .............. *G06Q 10/10* (2013.01); *G06F 17/241* (2013.01); *G06T 19/20* (2013.01); *G06T 2215/16* (2013.01); *G06T 2219/024* (2013.01); *G06T 2219/2004* (2013.01); *H04L 67/14* (2013.01)

(58) Field of Classification Search
CPC ..... G06T 2215/16; G06T 19/20; H04L 67/14; H04L 67/1095; G06F 17/241
USPC .......................................................... 709/205
See application file for complete search history.

(56) References Cited

U.S. PATENT DOCUMENTS

| | | | |
|---|---|---|---|
| 6,397,192 B1 | 5/2002 | Notani et al. | |
| 7,039,655 B2 | 5/2006 | Kapczynski et al. | |
| 7,596,647 B1 * | 9/2009 | Van Dyke et al. | 710/244 |
| 7,644,008 B1 * | 1/2010 | Issa et al. | 705/7.11 |
| 7,676,542 B2 | 3/2010 | Moser et al. | |
| 7,885,847 B2 | 2/2011 | Wodtke et al. | |
| 8,450,686 B1 * | 5/2013 | Warnke et al. | 250/330 |
| 2004/0021685 A1 * | 2/2004 | Denoue et al. | 345/721 |
| 2008/0077996 A1 * | 3/2008 | Kubo | 726/27 |
| 2008/0120126 A1 | 5/2008 | Bone | |
| 2008/0183844 A1 * | 7/2008 | Gavin et al. | 709/217 |

(Continued)

OTHER PUBLICATIONS

Gkion, et al., "Collaborative 3D Digital Content Creation exploiting a Grid Network", Retrieved at <<http://ieeexplore.ieee.org/stamp/stamp.jsp?arnumber=05267221>>, International Conference on Information and Communication Technologies, Aug. 15-16, 2009, pp. 35-39.

(Continued)

*Primary Examiner* — John Breene
*Assistant Examiner* — Eyob Hagos
(74) *Attorney, Agent, or Firm* — Aaron Chatterjee; Kate Drakos; Micky Minhas

(57) ABSTRACT

Multiple users can edit the same digital scene concurrently, with different users using different computing devices and/or different programs running on one or more computing devices to edit the digital scene. Each program maintains its own representation of the digital scene. When a user of a program makes a change to the digital scene, the program communicates an indication of that change to the programs used by the other users, and those programs update their representations of the digital scene to reflect the change. Additionally, one of the users editing the digital scene can be an arbiter of the digital scene, determining which other users are permitted to edit the digital scene.

26 Claims, 7 Drawing Sheets

(56) References Cited

U.S. PATENT DOCUMENTS

| | | | |
|---|---|---|---|
| 2009/0073191 A1* | 3/2009 | Smith et al. | 345/629 |
| 2009/0187825 A1* | 7/2009 | Sandquist et al. | 715/719 |
| 2009/0278974 A1* | 11/2009 | Kuwahara et al. | 348/333.06 |
| 2009/0324137 A1* | 12/2009 | Stallings et al. | 382/306 |
| 2010/0014826 A1* | 1/2010 | Kojo et al. | 386/52 |
| 2010/0185973 A1 | 7/2010 | Ali et al. | |
| 2010/0325547 A1* | 12/2010 | Keng et al. | 715/723 |
| 2011/0030031 A1* | 2/2011 | Lussier et al. | 726/1 |
| 2011/0246892 A1* | 10/2011 | Hedges | 715/723 |

OTHER PUBLICATIONS

Muth, et al., "From Centralized Workflow Specification to Distributed Workflow Execution", Retrieved at <<http://citeseerx.ist.psu.edu/viewdoc/download?doi=10.1.1.32.6952&rep=rep1&type=pdf>>, Journal of Intelligent Information Systems—Special issue on workflow management systems, vol. 10, No. 2, Mar./Apr. 1998, pp. 1-25.

* cited by examiner

REAL TIME COLLABORATION FOR DIGITAL SCENE CREATION

BACKGROUND

Digital scenes are created for various uses, such as in movies and video games. These digital scenes are frequently a result of inputs from multiple different individuals. However, current systems for creating digital scenes typically allow only a single individual to edit the scene at any given time. This results in a situation in which the digital scene creation is time consuming due to the waterfall or serial nature of the creation process.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, at a computing device first change data for a digital scene is obtained from a digital scene editing module of a digital scene editing program running on the computing device. The first change data is sent to one or more additional computing devices each running an additional digital scene editing program. Second change data for the digital scene is also received from one of the one or more additional computing devices. The second change data is provided to the digital scene editing module.

In accordance with one or more aspects, at a first computing device a request is received from a second computing device for a user of the second computing device to be one of multiple users editing a digital scene. An indication of the request is displayed to an arbiter, who is a user of the first computing device. An input indicating whether the request is granted or denied is received. If the request is granted, then the user of the second computing device is allowed to be one of the multiple users editing the digital scene. If the request is denied, then the user of the second computing device is prevented from being one of the multiple users editing the digital scene.

BRIEF DESCRIPTION OF THE DRAWINGS

The same numbers are used throughout the drawings to reference like features.

DETAILED DESCRIPTION

Real time collaboration for digital scene creation is discussed herein. Multiple different users can edit the same digital scene concurrently. Different users can be using different computing devices and/or different programs running on one or more computing devices to edit the digital scene concurrently. Each program maintains its own representation of the digital scene. When a user of a program makes a change to the digital scene, the program communicates an indication of that change to the programs used by the other users, and those programs update their representations of the digital scene to reflect the change. Additionally, one of the users editing the digital scene can be an arbiter of the digital scene, determining which other users are permitted to edit the digital scene.

Figure 1:
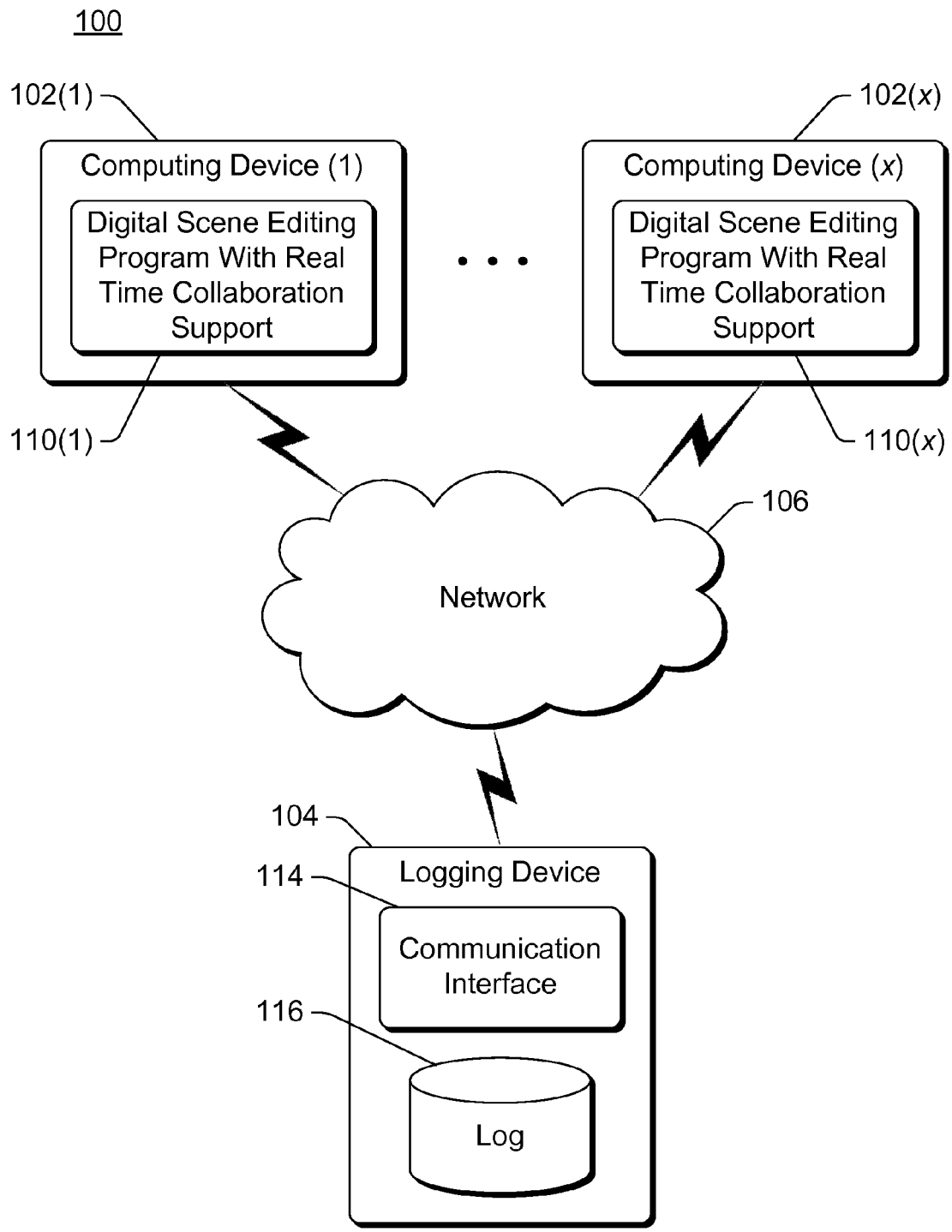
FIG. 1 illustrates an example system implementing the real time collaboration for digital scene creation in accordance with one or more embodiments.

FIG. 1 illustrates an example system 100 implementing the real time collaboration for digital scene creation in accordance with one or more embodiments. System 100 includes multiple computing devices 102(1), . . . , 102(x) and a logging device 104 that can communicate with one another via a network 106. Network 106 can be a variety of different networks, including the Internet, a local area network (LAN), a public telephone network, an intranet, other public and/or proprietary networks, combinations thereof, and so forth.

Each computing device 102 can be a variety of different types of devices, such as a physical device or a virtual device. For example, a computing device 102 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. A computing device 102 can also be a virtual device, such as a virtual machine running on a physical device. A virtual machine can be run on any of a variety of different types of physical devices (e.g., any of the various types listed above). Different computing devices 102 can be different types of devices, or alternatively one or more computing devices 102 can be the same type of device.

Logging device 104 can be a variety of different computing devices capable of logging data regarding changes to digital scenes, as discussed in more detail below. Similar to the discussion of computing devices 102, logging device 104 can be a variety of different types of devices.

Each computing device 102 includes a digital scene editing program 110. Each digital scene editing program 110 is a program supporting real time collaboration, allowing multiple users of multiple computing devices 102 to edit a digital scene concurrently. Each digital scene editing program 110 can be the same type of program, or alternatively different digital scene editing programs 110 can be different types of programs. For example, digital scene editing programs 110 can include image capture programs, live motion capture programs, animation programs, digital editing or drawing programs, and so forth.

As discussed in more detail below, each digital scene editing program 110 maintains its own representation of the digital scene. There is no centralized server and no centralized copy or version of the digital scene that the various programs 110 access and edit. Rather, changes made to a digital scene by one program 110 are communicated to one or more other programs 110, which reflect the changes in their respective representations of the digital scene.

System 100 is illustrated with each computing device 102 including a digital scene editing program 110. Alternatively, one or more digital scene editing programs 110 can be run distributed across multiple computing devices 102, and/or multiple digital scene editing programs can be included and run on a single computing device 102.

Logging device 104 includes a communication interface 114 and a log 116. Communication interface 114 allows computing devices 102 to communicate changes to digital scenes to logging device 104, which stores the changes in log 116. Communication interface 114 also allows computing devices 102 to request changes to digital scenes, in response to which logging device 104 provides to the requesting computing device 102 the changes to the digital scene that are stored in log 116. Logging device 104 and its use are discussed in more detail below.

A digital scene refers to a scene displaying image data that is typically, but need not be, 3-dimensional (3D) image data. A scene typically includes multiple frames of video, although can alternatively be a single frame of video. The digital scene can be used in a variety of different settings, such as a movie, a video game, and so forth. A scene can include different parts, and the particular parts of a digital scene can vary by digital scene. For example, parts of a digital scene could include buildings, landscape, characters, animals or other creatures, vehicles, and so forth. These parts of the digital scene can be static (remaining unchanged across multiple frames of video) or dynamic (changing across multiple frames of video).

Multiple users can make changes to a digital scene, which is also referred to as editing the digital scene. The editing of a digital scene is also referred to as creating a digital scene or digital content creation. The techniques discussed herein support multiple users editing the digital scene concurrently, collaborating in real time to create the digital scene.

Figure 2:
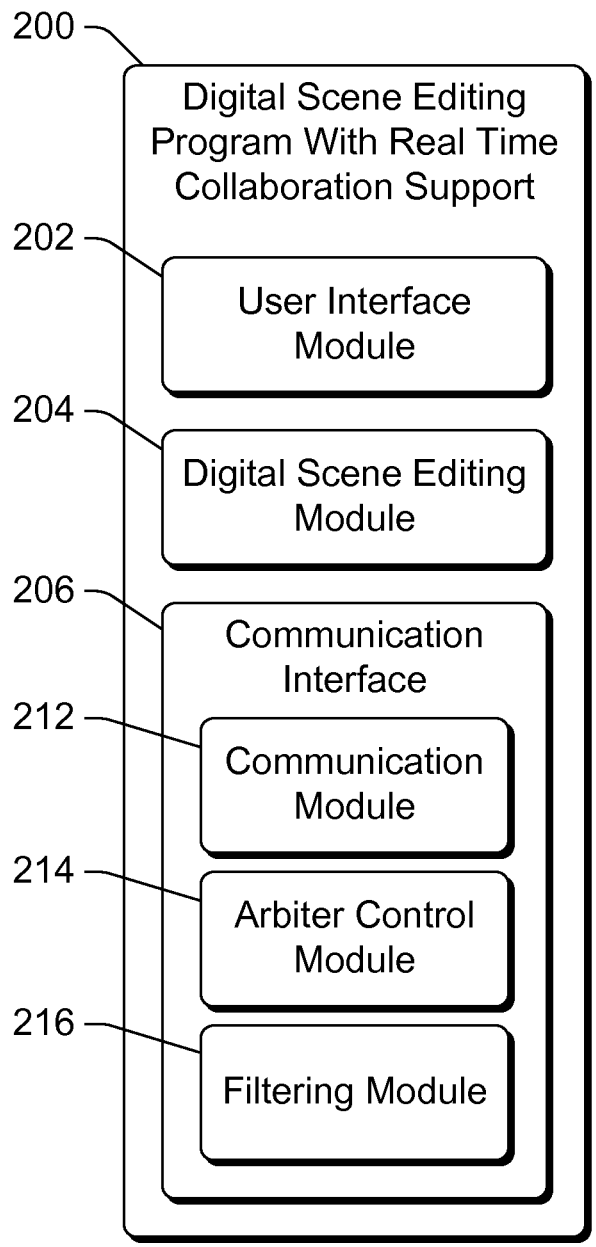
FIG. 2 illustrates an example digital scene editing program with real time collaboration support in accordance with one or more embodiments.

FIG. 2 illustrates an example digital scene editing program with real time collaboration support 200 in accordance with one or more embodiments. Digital scene editing program 200 can be a digital scene editing program 110 of FIG. 1. Digital scene editing program 200 includes a user interface module 202, a digital scene editing module 204, and a communication interface 206.

User interface module 202 receives user inputs from a user of the computing device running digital scene editing program 200. User inputs can be provided in a variety of different manners, such as by pressing one or more keys of a keypad or keyboard of the computing device, pressing one or more keys of a controller (e.g., remote control device, mouse, trackpad, etc.) of the computing device, manipulating a controller (e.g., mouse, stylus, etc.), pressing a particular portion of a touchpad or touchscreen of the computing device, making a particular gesture on a touchpad or touchscreen of the computing device, and/or making a particular gesture on a controller (e.g., remote control device, mouse, trackpad, etc.) of the computing device. User inputs can also be provided via other physical feedback input to the computing device, such as tapping any portion of the computing device, an action that can be recognized by a motion detection component of the computing device (such as shaking the computing device, rotating the computing device, etc.), and so forth. User inputs can also be provided in other manners, such as via audible inputs to a microphone, via motions of hands or other body parts observed by an image capture device, and so forth.

Digital scene editing module 204 includes various functionality supporting editing of digital scenes. Digital scene editing module 204 can include various graphics and/or 3D rendering engines, scene manipulation modules, image or motion capture modules, and so forth. Digital scene editing module 204 supports editing of digital scenes based on user inputs received via user interface module 202, and also changes received from other digital scene editing programs via communication interface 206.

Communication interface 206 includes a communication module 212, optionally an arbiter control module 214, and optionally a filtering module 216. Generally, communication module 212 allows data indicating changes to the digital scene to be sent to and received from other computing devices running digital scene editing programs. Arbiter control module 214, when included in communication interface 206, allow a user of the computing device running digital scene editing program 200 to act as an arbiter and control which other users are permitted to edit the digital scene. Filtering module 216, when included in communication interface 206, filters data sent and/or received by communication interface 206, determining which data is to be sent to which other digital scene editing programs and/or which data received from other digital scene editing programs is to be provided to digital scene editing module 204.

Communication interface 206 is illustrated as being part of digital scene editing program 200. In alternate embodiments, however, communication interface 206 is implemented separately from, but communicates with, digital scene editing program 200.

Digital scene editing module 204 maintains a representation of the digital scene being edited by digital scene editing program 200. When a change is made to the digital scene by digital scene editing program 200 in response to a user input to program 200, data indicating the change made to the digital scene by digital scene editing module 204 (also referred to as change data) is obtained by communication interface 206. The change data can be obtained by communication interface 206 in various manners, such as by digital scene editing module 204 invoking an application programming interface (API) of communication interface 206 or otherwise sending the data to communication interface 206, by digital scene editing module 204 storing the data (or an indication from which the data can be derived) in a location accessible to communication interface 206, and so forth.

The change data can identify the change in various manners, based at least in part on the change itself. Each digital scene can have various parts (e.g., landscaping, buildings, characters, animations, captured live motion, and so forth), and each part of the digital scene can have various elements (e.g., different trees that are part of landscaping, different characters, and so forth). Various characteristics or features of the digital scene can be changed, such as altering a color or texture of a part of the digital scene (e.g., of buildings, landscaping, etc.), adding an element to a part of the digital scene (e.g., adding a building, adding a character), moving an element of a part of the digital scene (e.g., moving a building, moving a tree or other landscaping, etc.), and so forth. The characteristic or feature of the digital scene that is changed, as well as the manner in which the characteristic or feature is changed, is included in the change data. For example, an indication of a particular element (e.g., a building) that is added as well as a description of that element (e.g., a location of the building in the digital scene, dimensions of the building, a color of the building, etc.) is included as the change data. By way of another example, an indication that a particular element (e.g., a lamppost) is moved as well as how that particular element has moved (e.g., a direction and distance (e.g., inches, centimeters, pixels, or other units)) is included as the change data.

Communication module 212 sends the change data to the other computing devices running digital scene editing programs that are editing the digital scene. The change data is received by those computing devices and provided to the digital scene editing programs run by those computing devices in an analogous manner as is done by digital scene editing program 200 as discussed below.

Communication module 212 also receives change data from other computing devices running other digital scene editing programs. This change data from other digital scene editing programs is typically change data resulting from users of those other digital scene editing programs providing user inputs changing the digital scene. Communication module 212 provides the change data received from those other computing devices to digital scene editing module 204, which updates the representation of the digital scene maintained by digital scene editing module 204. For example, if change data is received indicating a particular element (e.g., a building) has been added to the digital scene, then digital scene editing module 204 adds the particular element as described in the change data to the representation of the digital scene maintained by module 204. By way of another example, if change data is received indicating that a particular element (e.g., a tree) has been moved, then digital scene editing module 204 moves the particular element in the representation of the digital scene maintained by module 204 in the manner described in the change data (e.g., in a direction and distance indicated in the change data).

Figure 3:
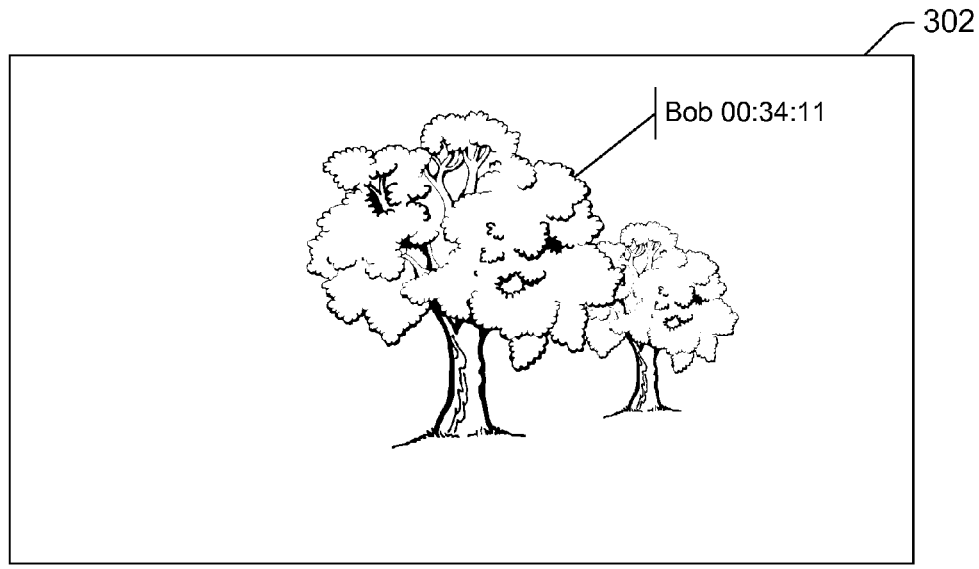
FIGS. 3, 4, and 5 illustrate example parts of a digital scene in accordance with one or more embodiments.
Figure 4:
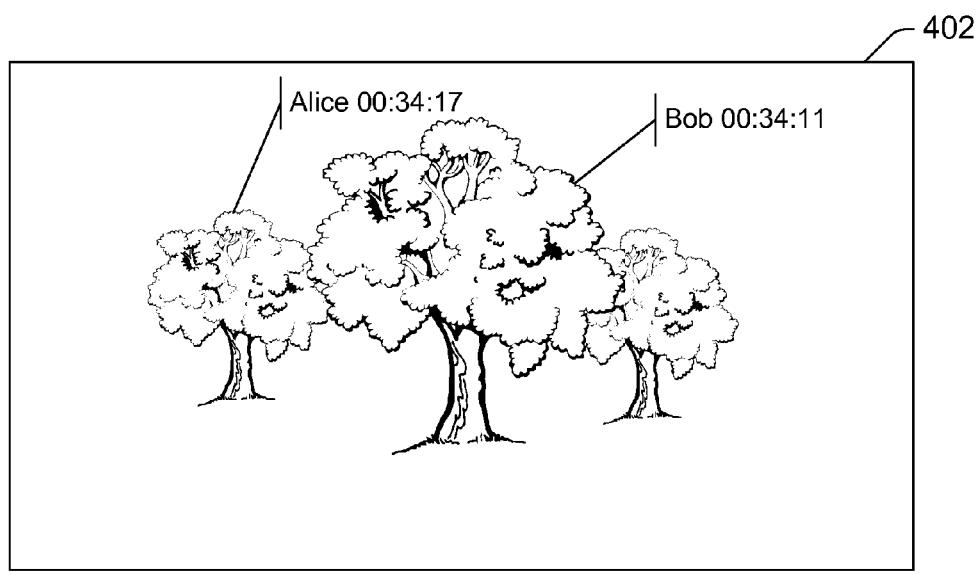
Figure 5:
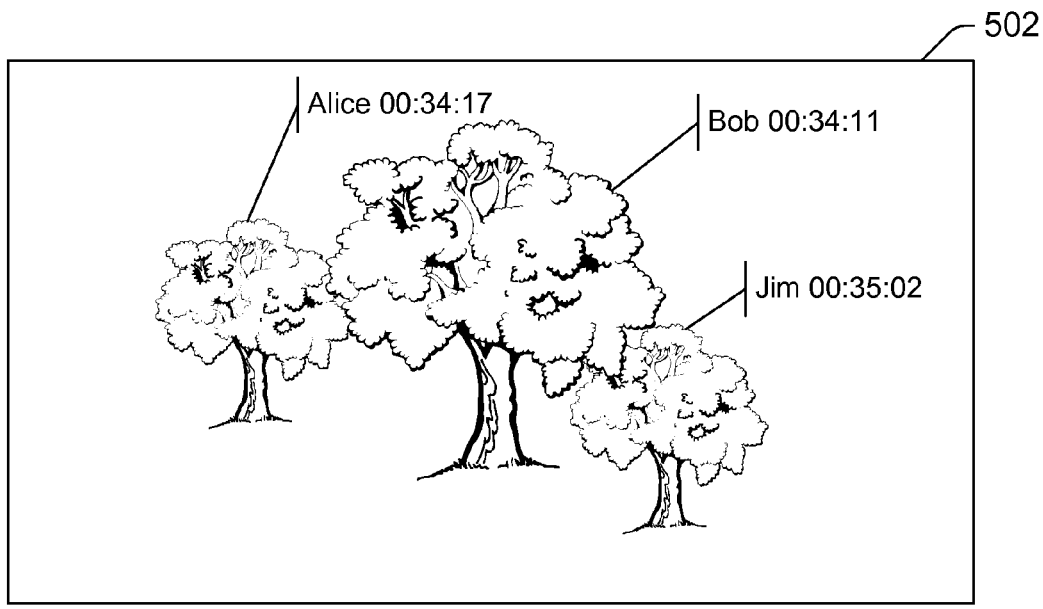

FIGS. 3, 4, and 5 illustrate example parts of a digital scene in accordance with one or more embodiments. The digital scene illustrated in FIGS. 3, 4, and 5 is a representation of the digital scene maintained by digital scene editing program 200. FIG. 3 illustrates an example part 302 of a digital scene. The part of the digital scene illustrated in FIG. 3 is landscaping that includes two elements, each element being a tree. It should be noted that the digital scene can include various additional parts (e.g., characters, buildings, and so forth), but these additional parts have not been illustrated to avoid cluttering the drawings. An indication of when one of the elements was last changed as well as the user that changed the element is optionally illustrated. For example, in FIG. 3 the tree element in the middle of the digital scene was last changed by the user "Bob" at the time "00:34:11".

Assume that a user of another digital scene editing program adds to digital scene 302 an additional element that is a third tree. Change data identifying the additional element (including its location in the digital scene) is received by digital scene editing program 200. Digital scene editing program 200 adds the identified additional element to its representation of the digital scene, resulting in an example part 402 of the digital scene illustrated in FIG. 4. An optional indication that the additional element was added by the user "Alice" at the time "00:34:17" is illustrated.

Further assume that a user of digital scene editing program 200 provides inputs to program 200 to move the rightmost tree element in the part 402 of the digital scene. Digital scene editing program 200 moves the element in its representation of the digital scene, resulting in an example part 502 of the digital scene illustrated in FIG. 5. An optional indication that the additional element was changed by the user "Jim" at the time "00:35:02" is illustrated. Change data identifying the element and the manner in which it was changed (e.g., direction and distance) is also provided to the other digital scene editing programs (subject to any filtering by filtering module 216 as discussed in more detail below).

Thus, as can be seen from the examples of FIGS. 3, 4, and 5, changes to the digital scene made by the user of digital scene editing program 200 are reflected in the representation of the digital scene maintained by program 200. Similarly, changes to the digital scene made by users of other digital scene editing programs are also reflected in the representation of the digital scene maintained by program 200.

Returning to FIG. 2, communication interface 206 optionally includes filtering module 216, which filters sending and/or receiving of change data. Filtering module 216 can filter change data obtained from digital scene editing module 204, determining which other digital scene editing programs the change data obtained from module 204 is to be sent by communication module 212. Whether change data is to be sent to another digital scene editing program can be determined in a variety of different manners. In one or more embodiments, a digital scene editing program indicates which types of change data the digital scene editing program desires to receive. The types of change data can be specified in different manners, such as changes to parts or elements of the digital scene that the digital scene editing program has opened for editing, changes to parts or elements of the digital scene that are of interest to a user of the digital scene editing program (e.g., as specified by the user of the digital scene editing program), and so forth.

For example, a particular digital scene editing program can have opened a particular part or element of a digital scene for editing, such as buildings, landscape, characters, and so forth, or otherwise determine that only a particular part or element of a digital scene (such as buildings, landscape, characters, and so forth) is of interest to a user of the particular digital scene editing program. That particular digital scene editing program can send notifications to other digital scene editing programs editing the digital scene that the particular digital scene editing program desires to receive change data for that particular part or element of the digital scene. Such notifications are received by communication interface 206, and used by filtering module 216 to determine whether to send particular change data to that particular digital scene editing program. If particular change data obtained from digital scene editing module 204 is change data for that particular part or element of the digital scene, then filtering module 216 determines that the particular change data is to be sent to that particular digital scene editing program; otherwise, filtering module 216 determines that the particular change data is not to be sent to that particular digital scene editing program.

Additionally, or alternatively, filtering module 216 can filter change data received from other digital scene editing programs, determining whether received change data is to be provided to digital scene editing module 204 by communication module 212. Whether received change data is to be provided to digital scene editing module 204 can be determined in a variety of different manners, analogous to the discussion above regarding determining whether change data is to be sent to another digital scene editing program (e.g., change data for parts or elements of the digital scene that digital scene editing program 200 has opened for editing, changes to parts or elements of the digital scene that are of interest to a user of digital scene editing program 200, and so forth).

For example, digital scene editing program 200 can have opened a particular part or element of a digital scene for editing, such as buildings, landscape, characters, and so forth, or determine that only a particular part or element of a digital scene (such as buildings, landscape, characters, and so forth) is of interest to a user of digital scene editing program 200.

Digital scene editing program 200 notifies communication interface 206 that particular digital scene editing program 200 desires to receive change data for that particular part or element of the digital scene. This notification is used by filtering module 216 to determine whether to provide change data received from other digital scene editing programs to digital scene editing program 200. If particular change data received from another digital scene editing module is change data for that particular part or element of the digital scene, then filtering module 216 determines that the particular change data is to be provided to digital scene editing module 204; otherwise, filtering module 216 determines that the particular change data is not to be provided to digital scene editing module 204.

The different digital scene editing programs that are editing a particular digital scene can be identified in a variety of different manners. In one or more embodiments, the communication interface of the digital scene editing program used by a user that acts as an arbiter for a digital scene maintains identifiers of the different digital scene editing programs that are editing the digital scene for which that user is the arbiter. That communication interface can notify the other digital scene editing programs of the various digital scene editing programs that are editing the digital scene. A digital scene editing program can be identified in the notification in different manners, such as based on an identifier (e.g., a name, an Internet Protocol (IP) or other network address, etc.) of a computing device running the digital scene editing program, an identifier (e.g., serial number, name, etc.) of the digital scene editing program, and so forth.

Alternatively, the different digital scene editing programs that are editing a particular digital scene can be identified in other different manners. For example, when a digital scene editing program opens a digital scene for editing, that digital scene editing program can broadcast a notification that the digital scene editing program is editing that digital scene, and include an identifier of the digital scene editing program (or an identifier of a computing device running the digital scene editing program) in the notification. The notification can be broadcast to various computing devices, such as to particular predetermined computing devices, to all computing devices on a particular network, and so forth. For each computing device that receives the broadcast notification, if a digital scene editing program is running on the computing device the communication interface of the digital scene editing program receives the notification, providing the communication interface with an identifier of that particular digital scene editing program (or the computing device running that particular digital scene editing program) as well as the digital scene being edited by that digital scene editing program.

Returning to FIG. 1, in one or more embodiments change data is also sent to logging device 104. Logging device 104 includes a communication interface 114 that receives the change data and stores the change data in log 116. Logging device 104 can receive and store change data for different digital scenes, and stores the change data in a manner so that the change data corresponds to a particular digital scene, or otherwise maintains a record indicating which change data corresponds to which digital scenes. It should be noted that logging device 104 need not include a digital scene editing program, and that filtering modules of the communication interfaces of computing devices 102 determine that the change data is to be sent to logging device 104 even if logging device 104 does not include a digital scene editing program.

Communication interface 114 can also receive a request from a computing device 112 to retrieve change data for a particular digital scene. For example, an additional user may desire to begin editing a digital scene that is already being edited by multiple other users. The digital scene editing program used by the additional user can open or otherwise obtain a previously saved representation of the digital scene, and can request the change data for that particular digital scene from logging device 104. The change data can be applied by the digital scene editing program, allowing the digital scene editing program used by the additional user to have a representation of that particular digital scene that reflects the changes that have been made to the digital scene. Communication interface 114 can optionally include a filtering module, similar to filtering module 216 of FIG. 2, allowing communication interface 114 to send change data only for a particular part or element of the digital scene that the digital scene editing program used by the additional user has opened for editing, send change data for only a particular part or element of the digital scene that is of interest to the additional user, and so forth.

Returning to FIG. 2, communication interface 206 optionally includes arbiter control module 214, which allows a user of the computing device running digital scene editing program 200 to act as an arbiter and control which other users are permitted to edit the digital scene. This control can include determining whether an additional user requesting to edit the digital scene is allowed to edit the digital scene, preventing a user that was previously editing the digital scene from any further editing of the digital scene (e.g., kicking the user out), and so forth.

In one or more embodiments, when a user of a digital scene editing program desires to edit a digital scene, the digital scene editing program sends a request for the user to be able to edit the digital scene to communication interface 206. The request can include various information, such as an identification of the user, an identification of the computing device being used by the user, an identification of the digital scene editing program being used by the user, combinations thereof, and so forth.

Arbiter control module 214 presents the information regarding the request to a user of digital scene editing program 200 (also referred to as an arbiter) via user interface module 202. Module 202 receives a user input from the arbiter indicating whether the request is granted or denied by the arbiter. If the request is granted, then the user is allowed to edit the digital scene, and an indication of the user (and optionally an identification of the computing device and/or digital scene editing program used by the user) can be provided to the communication interfaces of the other digital scene editing programs editing the digital scene (thus informing the other digital scene editing programs to send change data to the requesting user's digital scene editing program). A response to the request is also provided to the digital scene editing program informing the digital scene editing program that the digital scene can be opened and/or edited by the user. An indication of the other users editing the digital scene (and optionally an identification of the computing devices and/or digital scene editing programs used by those other users) can be provided to the digital scene editing program, informing the digital scene editing program of the other digital scene editing programs to which the program is to send change data. However, if the request is not granted, then the user is not allowed to edit the digital scene. If the user is not allowed to edit the digital scene, a response to the request is provided to the digital scene editing program informing the digital scene editing program that the digital scene cannot be opened and/or edited by the user (in response to which the digital scene editing program does not open and/or allow the user to edit the digital scene).

Furthermore, in one or more embodiments, the request can be a request to edit a particular part or element of a digital scene rather than any part of a digital scene. Thus, the arbiter can determine whether to grant or deny a request to edit only the particular part or element of the scene rather than the entire digital scene. Additionally, the arbiter can determine to lock or otherwise prevent a particular part or element from being edited by one or more users after a request to edit that particular part or element by those one or more users has been granted. The determination to lock or otherwise prevent a particular part or element from being edited can be made in response to a request to lock or prevent the particular part from a digital scene editing program or user, or alternatively can be made by the arbiter absent any such request. If a particular part or element is locked or otherwise prevented from being edited by one or more users, the digital scene editing programs used by those one or more users are notified that the particular part or element is not to be edited by the user of the digital scene editing program, and the digital scene editing program ignores requests to edit that particular part or element until notified that the part or element is no longer locked or otherwise prevented from being edited by the user of the digital scene editing program.

Additionally, in one or more embodiments the arbiter (or alternatively another user) can provide inputs (via user interface module 202) indicating whether change data is to be recorded by a logging device (such as logging device 104). For example, the arbiter can provide a user input selecting a "record" option if change data is to be recorded by the logging device, in response to which an indication to record the change data is communicated to the logging device. By way of another example, the arbiter can provide a user input selecting a "pause" or "stop" option if change data is not to be recorded by the logging device, in response to which an indication to not record the change data is communicated to the logging device.

Furthermore, in one or more embodiments a user of digital scene editing program 200 can desire to playback an animation included in a digital scene being edited by digital scene editing program 200. The animation playback is streamed by communication module 212 to the digital scene editing programs that are also editing the digital scene, allowing the users of those digital scene editing programs to also see the animation. Which digital scene editing programs receive the streaming animation can be determined by filtering module 216. For example, if a particular digital scene editing program has opened a particular part or element of a digital scene for editing or indicated that only a particular part or element of a digital scene is of interest to a user of the particular digital scene editing program, and that particular part or element does not include animation in the digital scene, then the animation is not streamed to that particular digital scene editing program. However, if the particular part or element does include animation in the digital scene, then the animation is streamed to that particular digital scene editing program.

Figure 6:
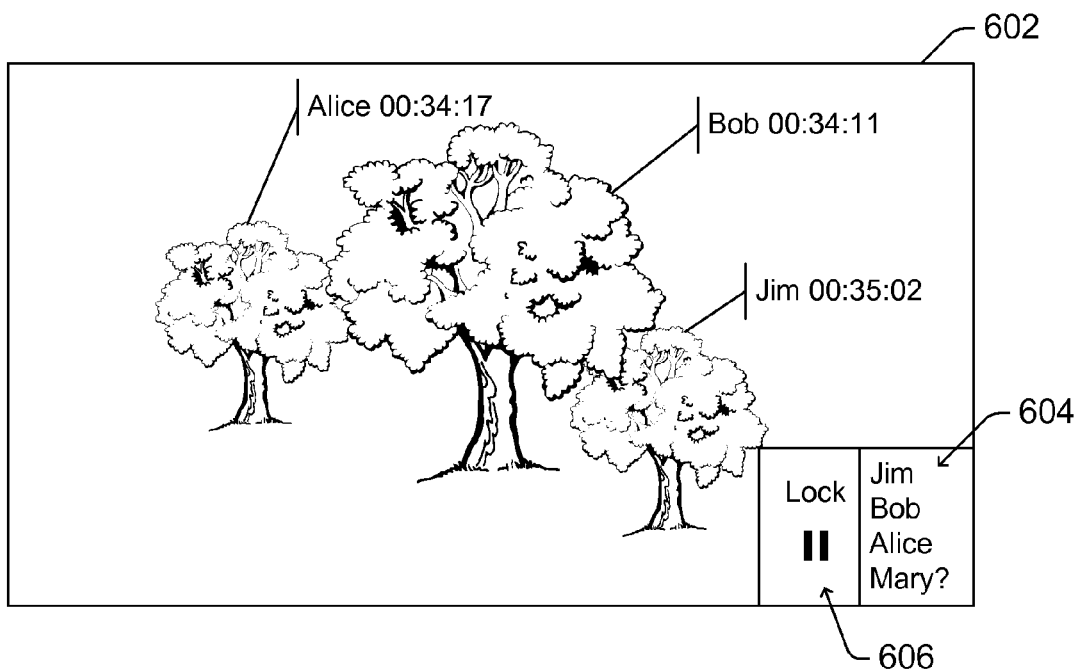
FIG. 6 illustrates an example arbiter user interface displayed overlaying a part of a digital scene in accordance with one or more embodiments.

FIG. 6 illustrates an example arbiter user interface displayed overlaying a part of a digital scene in accordance with one or more embodiments. The part 602 of the digital scene can be, for example, part 502 of the digital scene of FIG. 5. The arbiter user interface can be displayed in response to different events, such as a user input by the arbiter to display the arbiter user interface, in response to a request from a user of another digital scene editing program to edit the digital scene, and so forth. An arbiter user interface is displayed providing the arbiter with an indication 604 of the users the are currently editing the digital scene (e.g., Jim, Bob, and Alice), and a user requesting to edit the digital scene (e.g., Mary). The user requesting to edit the digital scene is identified using a question mark in the example of FIG. 6, although the user can alternatively be identified in other manners (e.g., different fonts, colors, locations within the arbiter user interface, etc.).

An additional control portion 606 of the arbiter user interface is also displayed. Control portion 606 illustrates two controls, a "lock" control and a pause or stop control (illustrated as two vertical lines). The arbiter can provide a user input selecting the lock control to prevent the part of the digital scene (or the digital scene) from being edited by the other users (users other than the arbiter). The arbiter can also provide a user input selecting the pause or stop control to stop a logging device from recording the change data to the digital scene.

It should be noted that the arbiter user interface illustrated in FIG. 6 is an example, and that the arbiter user interface can be presented to the arbiter in various other manners. For example, tiles or icons can be displayed for selection by the arbiter, menu items can be displayed for selection by the arbiter, the arbiter user interface can be displayed in a separate window rather than overlaying a part of a digital scene, and so forth. Additionally, it should be noted that various additional controls can be included in control portion 606, such as a record control that can be selected to cause the logging device to record the change data, a control to kick out one of the users currently editing the digital scene so that the user can no longer edit the digital scene, and so forth.

Figure 7:
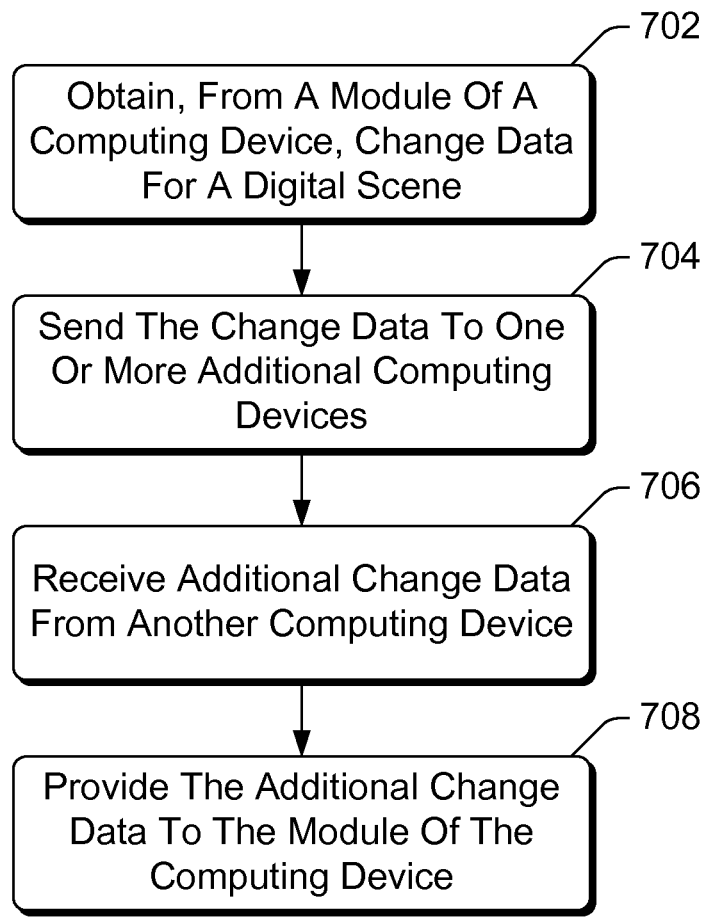
FIG. 7 is a flowchart illustrating an example process for a device implementing the real time collaboration for digital scene creation in accordance with one or more embodiments.

FIG. 7 is a flowchart illustrating an example process 700 for a device implementing the real time collaboration for digital scene creation in accordance with one or more embodiments. Process 700 is carried out by a computing device, such as a computing device 102 of FIG. 1 or a computing device 200 of FIG. 2, and can be implemented in software, firmware, hardware, or combinations thereof. Process 700 is shown as a set of acts and is not limited to the order shown for performing the operations of the various acts. Process 700 is an example process for implementing the real time collaboration for digital scene creation; additional discussions of implementing the real time collaboration for digital scene creation are included herein with reference to different figures.

In process 700, change data for a digital scene is obtained from a module of a computing device (act 700). The module is a digital scene editing module being run by the computing device implementing process 700 as part of a digital scene editing program, as discussed above.

The obtained change data is sent to one or more additional computing devices (act 704). These one or more additional computing devices are running additional digital scene editing programs and/or are logging devices, as discussed above. Additionally, a filtering module can be used to determine which computing devices the change data is to be sent to, as discussed above.

Additional change data is received from another computing device (act 706). The change data is received in response to changes made to the digital scene by a user of another digital scene editing program on the other computing device, as discussed above.

The received additional change data is provided to the module of the computing device (act 708). The module is a digital scene editing module being run by the computing device implementing process 700 as part of a digital scene editing program, as discussed above. Additionally, a filtering module can be used to determine whether the additional change data is to be provided to the module, as discussed above.

Figure 8:
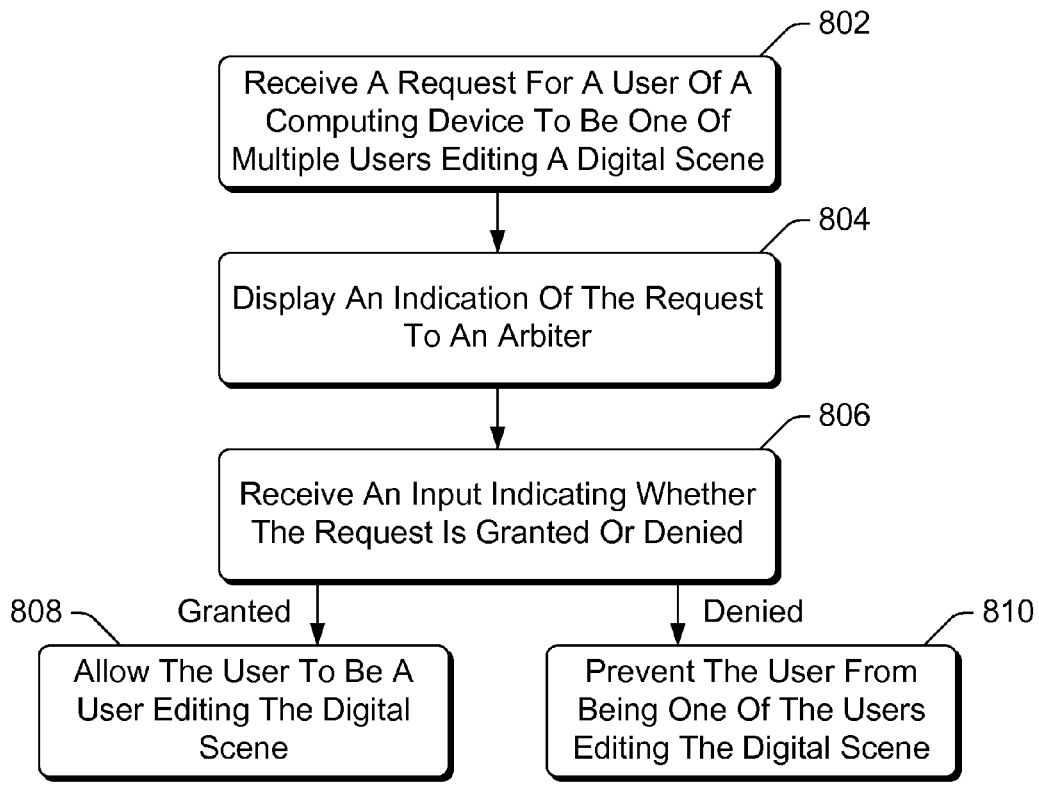
FIG. 8 is a flowchart illustrating another example process for a device implementing the real time collaboration for digital scene creation in accordance with one or more embodiments.

FIG. 8 is a flowchart illustrating another example process 800 for a device implementing the real time collaboration for digital scene creation in accordance with one or more embodiments. Process 800 is carried out by a computing device, such as a computing device 102 of FIG. 1 or a computing device 200 of FIG. 2, and can be implemented in software, firmware, hardware, or combinations thereof. Process 800 is shown as a set of acts and is not limited to the order shown for performing the operations of the various acts. Process 800 is an example process for implementing the real time collaboration for digital scene creation; additional discussions of implementing the real time collaboration for digital scene creation are included herein with reference to different figures.

In process 800, a request for a user of a computing to be one of multiple users editing a digital scene is received (act 802). The request is received from a digital scene editing program being used by the user, as discussed above.

An indication of the request is displayed or otherwise presented to an arbiter (act 804). The request can be displayed as part of an arbiter user interface as discussed above.

A user input is received from the arbiter indicating whether the request is granted or denied (act 806). The user input can be provided in a variety of different manners as discussed above.

If the user input indicates the request is granted, then the user is allowed to be one of the multiple users editing the digital scene (act 808). However, if the user input indicates the request is denied, then the user is prevented from being one of the multiple users editing the digital scene (act 810).

Various actions such as communicating, receiving, sending, recording, storing, obtaining, and so forth performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 9:
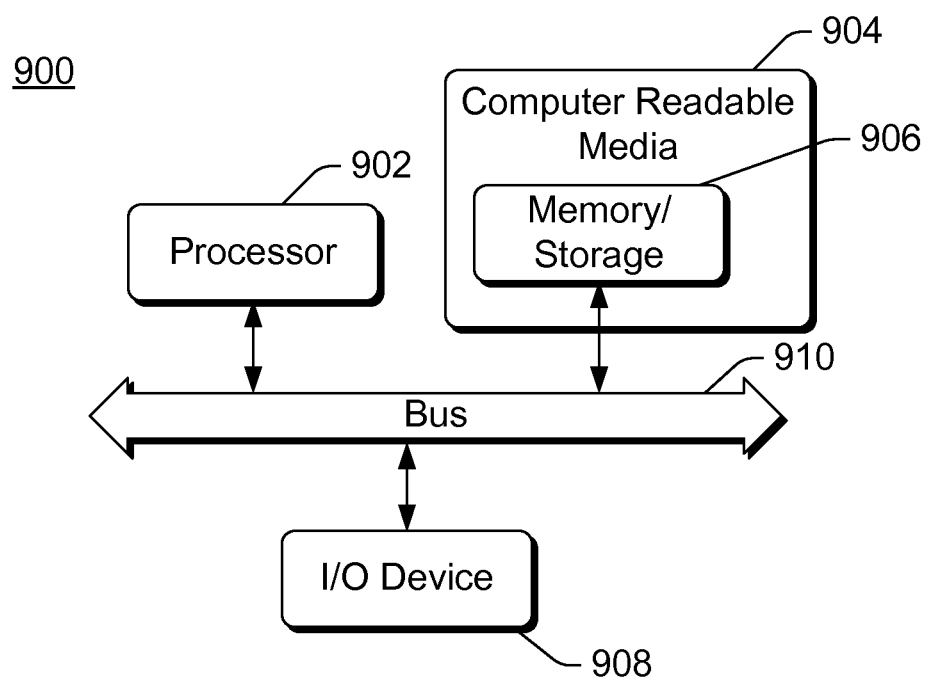
FIG. 9 illustrates an example computing device that can be configured to implement the real time collaboration for digital scene creation in accordance with one or more embodiments.

FIG. 9 illustrates an example computing device 900 that can be configured to implement the real time collaboration for digital scene creation in accordance with one or more embodiments. Computing device 900 can be, for example, a computing device 102 of FIG. 1 or a computing device 200 of FIG. 2.

Computing device 900 includes one or more processors or processing units 902, one or more computer readable media 904 which can include one or more memory and/or storage components 906, one or more input/output (I/O) devices 908, and a bus 910 that allows the various components and devices to communicate with one another. Computer readable media 904 and/or one or more I/O devices 908 can be included as part of, or alternatively may be coupled to, computing device 900. Processor 902, computer readable media 904, one or more of devices 908, and/or bus 910 can optionally be implemented as a single component or chip (e.g., a system on a chip). Bus 910 represents one or more of several types of bus structures, including a memory bus or memory controller, a peripheral bus, an accelerated graphics port, a processor or local bus, and so forth using a variety of different bus architectures. Bus 910 can include wired and/or wireless buses.

Memory/storage component 906 represents one or more computer storage media. Component 906 can include volatile media (such as random access memory (RAM)) and/or non-volatile media (such as read only memory (ROM), Flash memory, optical disks, magnetic disks, and so forth). Component 906 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 902. It is to be appreciated that different instructions can be stored in different components of computing device 900, such as in a processing unit 902, in various cache memories of a processing unit 902, in other cache memories of device 900 (not shown), on other computer readable media, and so forth. Additionally, it is to be appreciated that the location where instructions are stored in computing device 900 can change over time.

One or more input/output devices 908 allow a user to enter commands and information to computing device 900, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communication media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media refer to media for storage of information in contrast to mere signal transmission, carrier waves, or signals per se. Thus, computer storage media refers to non-signal bearing media, and is not communication media.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 9. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth. The features of the real time collaboration for digital scene creation techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage media having stored thereon multiple instructions that, when executed by one or more processors of a first computing device, cause the one or more processors to perform operations comprising:
    obtaining, at the first computing device from a first digital scene editing module of a first digital scene editing program running on the first computing device, first change data for a digital scene, the first change data indicating changes to a first element of the digital scene made on a representation of the digital scene maintained on the first computing device;
    sending the first change data to one or more additional computing devices each running an additional digital scene editing program and each maintaining its own representation of the digital scene;
    receiving at the first computing device, from one of the one or more additional computing devices, second change data for the digital scene, the second change data indicating changes to a second element of the digital scene made on a representation of the digital scene maintained on the one of the one or more additional computing devices;
    providing the second change data to the first digital scene editing module;
    displaying the digital scene in a user interface of the computing device, the digital scene including indications identifying a user and time of the changes to the first element of the digital scene based on the first change data; and
    displaying in the digital scene indications identifying a user and time of the changes to the second element of the digital scene based on the second change data if the second change data is part of the digital scene that the digital scene editing module has opened for editing.

2. One or more computer storage media as recited in claim 1, the multiple instructions further causing the one or more processors to determine which of multiple digital scene editing programs the first change data is to be sent to, and the multiple instructions further causing the one or more processors to send the first change data to only computing devices running digital scene editing programs to which the first change data is to be sent.

3. One or more computer storage media as recited in claim 2, the multiple instructions further causing the one or more processors to determine that one of the multiple digital scene editing programs is a program to which the first change data is to be sent in response to the one of the multiple digital scene editing programs having opened a part of the digital scene for editing and the first change data being change data for the part of the digital scene.

4. One or more computer storage media as recited in claim 2, the multiple instructions further causing the one or more processors to determine that one of the multiple digital scene editing programs is a program to which the first change data is to be sent in response to the first change data being change data for a part of the digital scene that is of interest to a user of the one of the multiple digital scene editing programs.

5. One or more computer storage media as recited in claim 1, the multiple instructions further causing the one or more processors to determine whether the second change data is to be provided to the first digital scene editing module, and the multiple instructions further causing the one or more processors to provide the second change data to the first digital scene editing module only if it is determined that the second change data is to be provided to the first digital scene editing module.

6. One or more computer storage media as recited in claim 5, the multiple instructions further causing the one or more processors to determine that the second change data is to be provided to the first digital scene editing module if the second change data is for a part of the digital scene that the first digital scene editing program has opened for editing.

7. One or more computer storage media as recited in claim 5, the multiple instructions further causing the one or more processors to determine that the second change data is to be provided to the first digital scene editing module if the second change data is for a part of the digital scene that is of interest to a user of the first digital scene editing program.

8. One or more computer storage media as recited in claim 1, a user of the digital scene editing program comprising an arbiter that can control which other users can edit the digital scene.

9. One or more computer storage media as recited in claim 8, the multiple instructions further causing the one or more processors to:
    receive, from a particular computing device, a request for a user of the particular computing device to be one of multiple users editing the digital scene;
    display an indication of the request to the arbiter;
    receive an input indicating whether the request is granted or denied;
    allow the user of the particular computing device to be one of the multiple users editing the digital scene if the request is granted; and
    prevent the user of the particular computing device from being one of the multiple users editing the digital scene if the request is denied.

10. One or more computer storage media as recited in claim 1, the multiple instructions further causing the one or more processors to send the first change data to a logging device that logs the first change data.

11. A method implemented in a first computing device, the method comprising:
- receiving, via a digital scene editing program, from a second computing device, a request for a user of the second computing device to be one of multiple users editing a digital scene;
- displaying, via the digital scene editing program, an indication of the request to an arbiter, the arbiter comprising a user of the first computing device;
- receiving a user input from the arbiter indicating whether the request is granted or denied;
- allowing the user of the second computing device to be one of the multiple users editing the digital scene if the request is granted; and
- preventing the user of the second computing device from being one of the multiple users editing the digital scene if the request is denied.

12. A method as recited in claim 11, further comprising displaying a pause option that can be selected by the arbiter, and in response to selection of the pause option sending an indication to a logging device to not record change data for the digital scene.

13. A method as recited in claim 11, further comprising preventing a user that was previously editing the digital scene from further editing the digital scene.

14. A method as recited in claim 11, further comprising, in response to a user input indicating to lock the digital scene, preventing the multiple users from editing the digital scene.

15. A method as recited in claim 11, further comprising, if the request is granted:
- obtaining, from a digital scene editing module of the digital scene editing program running on the first computing device, first change data for the digital scene;
- sending the first change data to the second computing device;
- receiving, from the second computing device, second change data for the digital scene; and
- providing the second change data to the digital scene editing module.

16. A method as recited in claim 15, further comprising determining whether the second computing device is a computing device to which the first change data is to be sent, and sending the first change data to the second computing device only if the second computing device is a computing device to which the first change data is to be sent.

17. A method as recited in claim 16, further comprising determining that the second computing device is a computing device to which the first change data is to be sent if the second computing device is running a digital scene editing program having opened a part of the digital scene for editing and the first change data is change data for the part of the digital scene.

18. A method as recited in claim 16, further comprising determining that the second computing device is a computing device to which the first change data is to be sent if the first change data is change data for a part of the scene that is of interest to the user of the second computing device.

19. A method as recited in claim 15, further comprising determining whether the second change data is to be provided to the digital scene editing module based on whether the second change data is for a part of a digital scene that the digital scene editing program has opened for editing or if the second change data is for a part of the digital scene that is of interest to the user of the first computing device, and providing the second change data to the digital scene editing module only if it is determined that the second change data is to be provided to the digital scene editing module.

20. A method comprising:
- obtaining, at a computing device from a digital scene editing module of a digital scene editing program running on the computing device, first change data for a digital scene;
- sending the first change data to one or more additional computing devices, at least one of the one or more additional computing devices running an additional digital scene editing program and at least one of the one or more additional computing devices comprising a logging device that logs the first change data;
- receiving, from one of the one or more additional computing devices, second change data for the digital scene;
- providing the second change data to the digital scene editing module only if the second change data is for a part of the digital scene that the digital scene editing module has opened for editing or if the second change data is for a part of the digital scene that is of interest to a user of the digital scene editing module;
- displaying the digital scene in a user interface of the computing device, the digital scene including indications identifying a user and time of the changes to the digital scene based on the first change data; and
- displaying in the digital scene, indications identifying a user and time of the changes to the digital scene based on the second change data if the second change data is part of the digital scene that the digital scene editing module has opened for editing.

21. A first computing device comprising:
one or more processors; and
one or more computer storage media having stored thereon multiple instructions that, when executed by the one or more processors, cause the one or more processors to:
- obtain, at the first computing device from a first digital scene editing module of a first digital scene editing program running on the first computing device, first change data for a digital scene, the first change data indicating changes to a first element of the digital scene made on a representation of the digital scene maintained on the first computing device;
- send the first change data to one or more additional computing devices each running an additional digital scene editing program and each maintaining its own representation of the digital scene;
- receive at the first computing device, from one of the one or more additional computing devices, second change data for the digital scene, the second change data indicating changes to a second element of the digital scene made on a representation of the digital scene maintained on the one of the one or more additional computing devices;
- provide the second change data to the first digital scene editing module;
- display the digital scene in a user interface of the computing device, the digital scene including indications identifying a user and time of the changes to the first element of the digital scene based on the first change data; and
- display in the digital scene indications identifying a user and time of the changes to the second element of the digital scene based on the second change data if the second change data is part of the digital scene that the digital scene editing module has opened for editing.

22. A first computing device as recited in claim 21, the multiple instructions further causing the one or more processors to determine which of multiple digital scene editing programs the first change data is to be sent to, and the multiple instructions further causing the one or more processors to send the first change data to only computing devices running digital scene editing programs to which the first change data is to be sent.

23. A first computing device as recited in claim 21, a user of the digital scene editing program comprising an arbiter that can control which other users can edit the digital scene.

24. A first computing device comprising:
   one or more processors; and
   one or more computer storage media having stored thereon multiple instructions that, when executed by the one or more processors, cause the one or more processors to:
      receive, via a digital scene editing program, from a second computing device, a request for a user of the second computing device to be one of multiple users editing a digital scene;
      display, via the digital scene editing program, an indication of the request to an arbiter, the arbiter comprising a user of the first computing device;
      receive a user input from the arbiter indicating whether the request is granted or denied;
      allow the user of the second computing device to be one of the multiple users editing the digital scene if the request is granted; and
      prevent the user of the second computing device from being one of the multiple users editing the digital scene if the request is denied.

25. A first computing device as recited in claim 24, the multiple instructions further causing the one or more processors to display a pause option that can be selected by the arbiter, and in response to selection of the pause option sending an indication to a logging device to not record change data for the digital scene.

26. A first computing device as recited in claim 24, the multiple instructions further causing the one or more processors to prevent a user that was previously editing the digital scene from further editing the digital scene.

* * * * *